United States Patent
Vasudeva et al.

(10) Patent No.: US 6,511,268 B1
(45) Date of Patent: Jan. 28, 2003

(54) TOOL DEVICE WITH REVERSIBLE DRILL BIT/SCREW BIT

(75) Inventors: Kailash C. Vasudeva, Waterloo (CA); Maz A. Hasan, Kitchener (CA); Satnam Singh, Waterloo (CA)

(73) Assignee: Maxtech Manufacturing Inc., Waterloo (CA)

( * ) Notice: Subject to any disclaimer, the term of this patent is extended or adjusted under 35 U.S.C. 154(b) by 89 days.

(21) Appl. No.: 09/635,834

(22) Filed: Aug. 11, 2000

Related U.S. Application Data

(60) Provisional application No. 60/148,589, filed on Aug. 13, 1999.

(51) Int. Cl.[7] ............................................... B23B 51/08

(52) U.S. Cl. ...................... 408/239 R; 279/14; 279/90; 279/143; 279/904; 81/451; 408/224; 408/202

(58) Field of Search ................. 279/14, 79–82, 279/89, 90, 143–145, 904, 905; 408/239 R, 239 A, 202, 224, 225, 713, 226; 81/451

(56) References Cited

U.S. PATENT DOCUMENTS

| | | | | |
|---|---|---|---|---|
| 772,912 A | * | 10/1904 | Allam | 81/451 |
| 1,267,704 A | * | 5/1918 | Skrukrud | 408/202 |
| 2,592,978 A | * | 4/1952 | Trimboli | 81/177.1 |
| 4,580,933 A | * | 4/1986 | Wilkins | 408/225 |
| 4,736,658 A | | 4/1988 | Jore | |
| 5,052,253 A | | 10/1991 | Lin | |
| 5,195,761 A | * | 3/1993 | Elmer | 279/90 |
| 5,309,799 A | * | 5/1994 | Jore | 81/451 |
| 5,507,209 A | | 4/1996 | Allen et al. | |
| 5,779,404 A | * | 7/1998 | Jore | 408/239 R |
| 6,302,408 B1 | * | 10/2001 | Zierpka | 279/14 |
| 6,325,393 B1 | * | 12/2001 | Chen et al. | 279/905 |
| 6,347,914 B1 | * | 2/2002 | Boyl et al. | 408/239 A |

FOREIGN PATENT DOCUMENTS

| | | | |
|---|---|---|---|
| WO | WO-98/51450 A2 | * 11/1998 | 279/14 |

* cited by examiner

Primary Examiner—Steven C. Bishop
(74) Attorney, Agent, or Firm—Borden Ladner Gervais LLP; R. Craig Armstrong

(57) ABSTRACT

A tool holder comprising an elongated connector means having a first end and a second end, where the elongated connector means has a central longitudinal hole, of a cross-section corresponding to a cross-section of a mounting portion of the tool bit, at the first end, and a tool mount at the second end, and a first sleeve arranged to reciprocally slide over the connector means between a first end position and a second end position, the first sleeve having a third end facing the tool bit and a fourth end facing the hand tool. The connector means has a substantially cylindrical tubular first collar arranged on the connector means adjacent the first end, the first collar having an inner diameter which is cooperating with an outside diameter of the connector means, to allow the first collar to rotate on the connector means, the first collar further having a first recess to hold a first locking ball, and a second recess and a third recess arranged on an outer surface of the connector means adjacent the first end, the first locking ball being movable between the second recess and the third recess by rotation of the first collar, and the first locking ball being held in the first recess during rotation of the first collar, so that the first locking all is seatable into either of the second or third recesses, the first collar further having a fourth recess for holding a substantially cylindrical pin, which pin rotates together with the first collar, a part of the pin reaching out into a slot arranged in the connecting means, the slot and the pin being located so that, when the first locking ball is seated in the second recess, the pin is at one extreme of the slot, and when the first locking ball is seated in the third recess, the pin is located at the other extreme. Retention of the tool bit is enabled by offsetting the hex opening in the first collar to engage the slot in the bit.

9 Claims, 13 Drawing Sheets

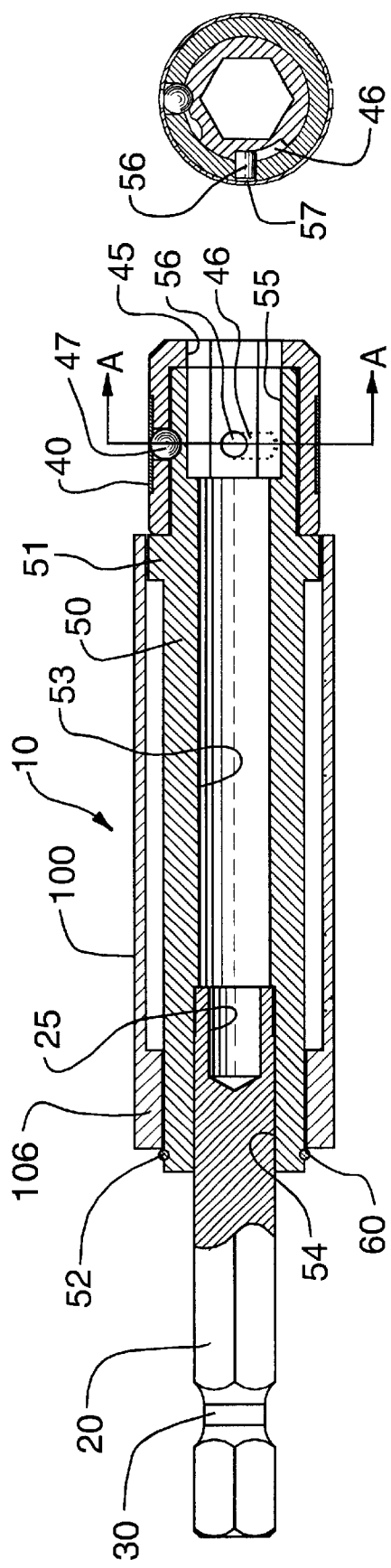
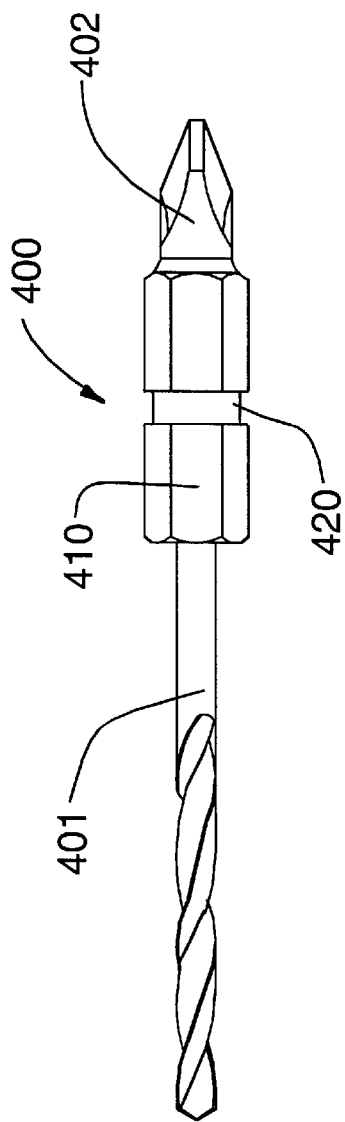
FIG.1A
FIG.1B
FIG.2

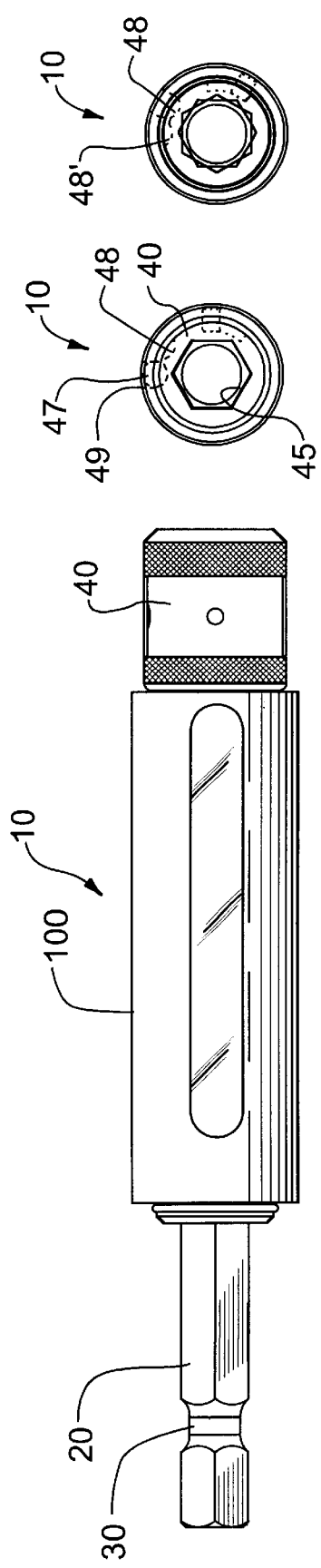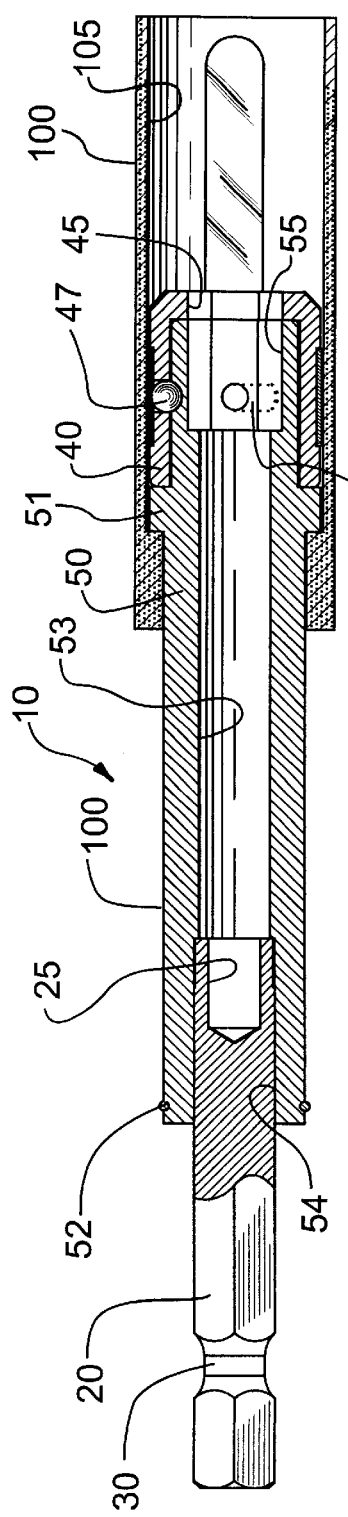

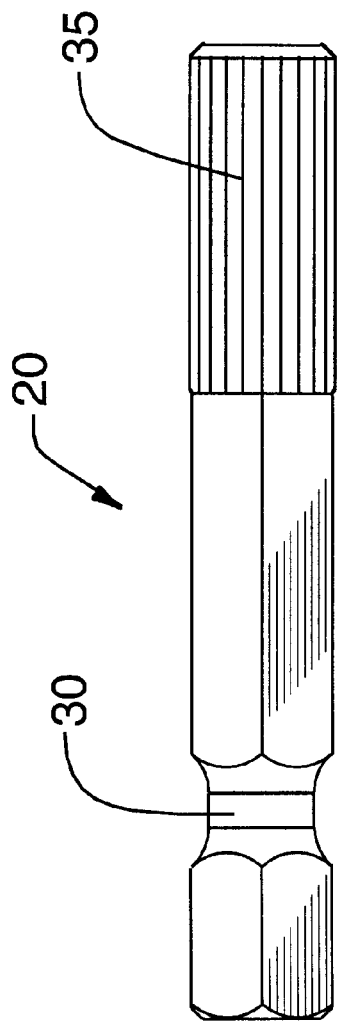
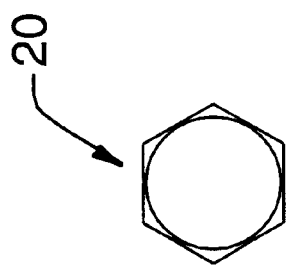
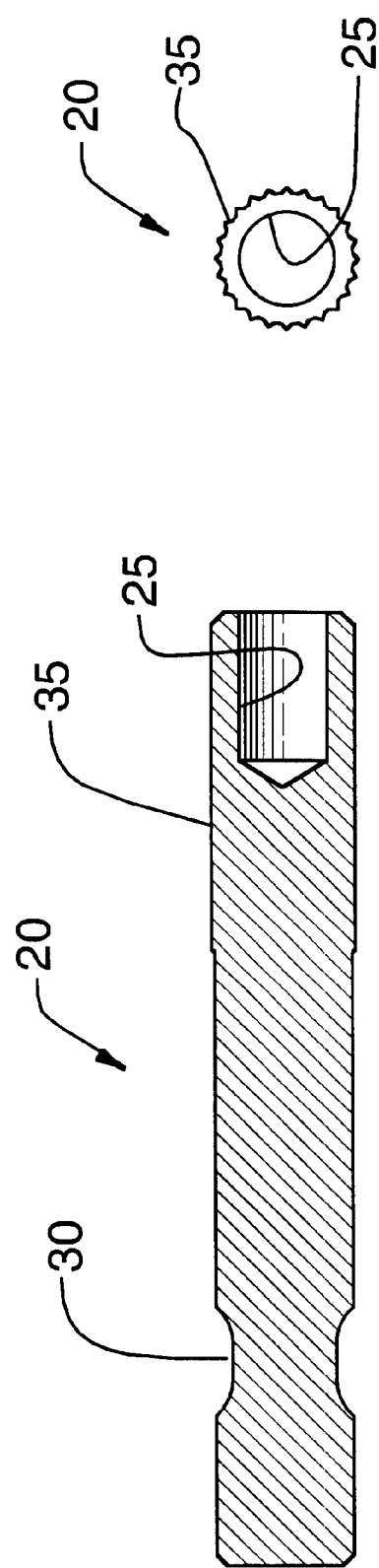
FIG.5A
FIG.5B
FIG.6A
FIG.6B

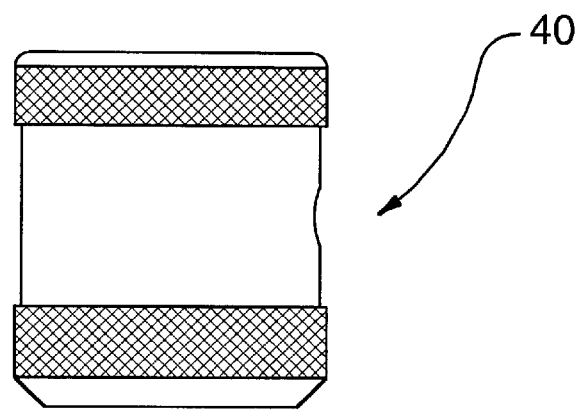
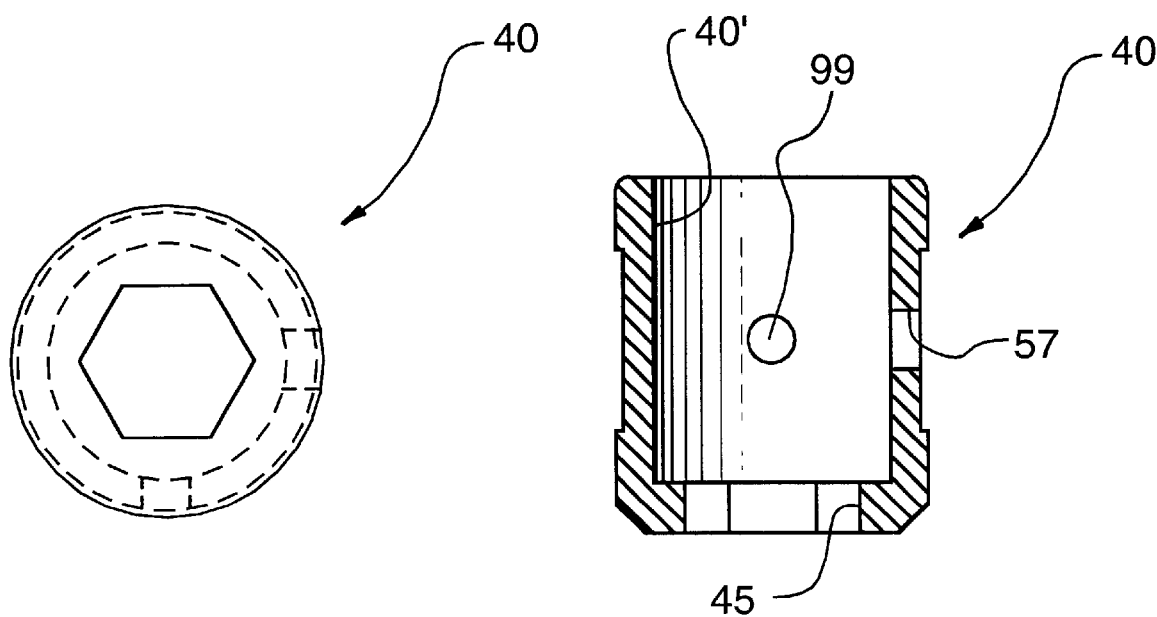
FIG.8A
FIG.8C   FIG.8B

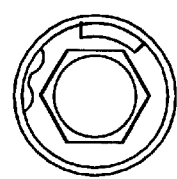
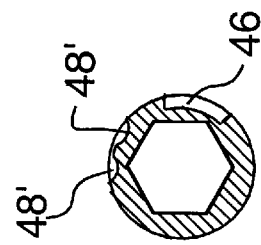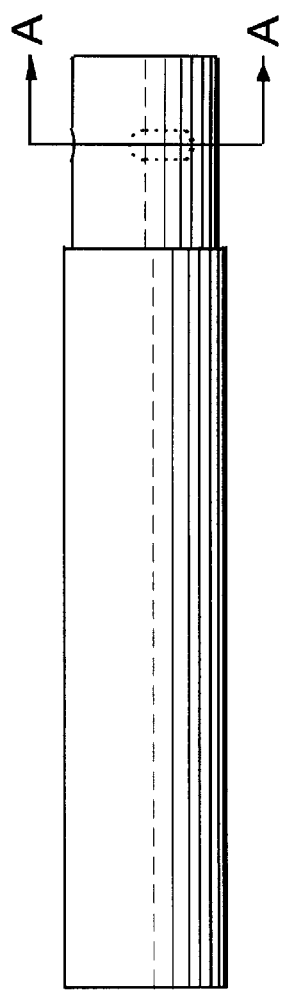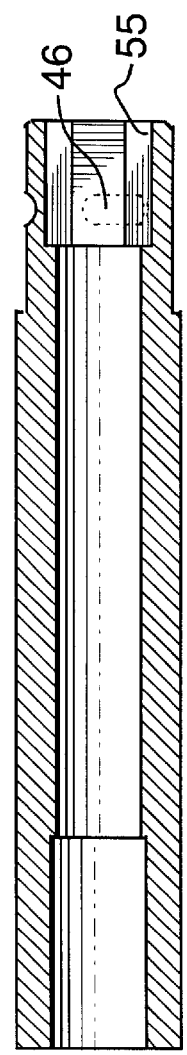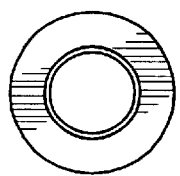

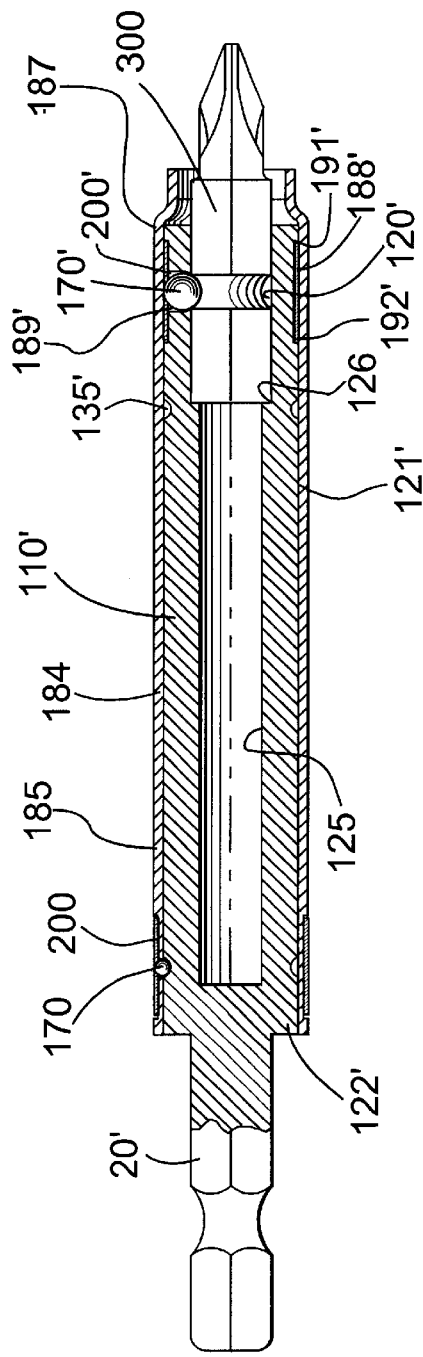
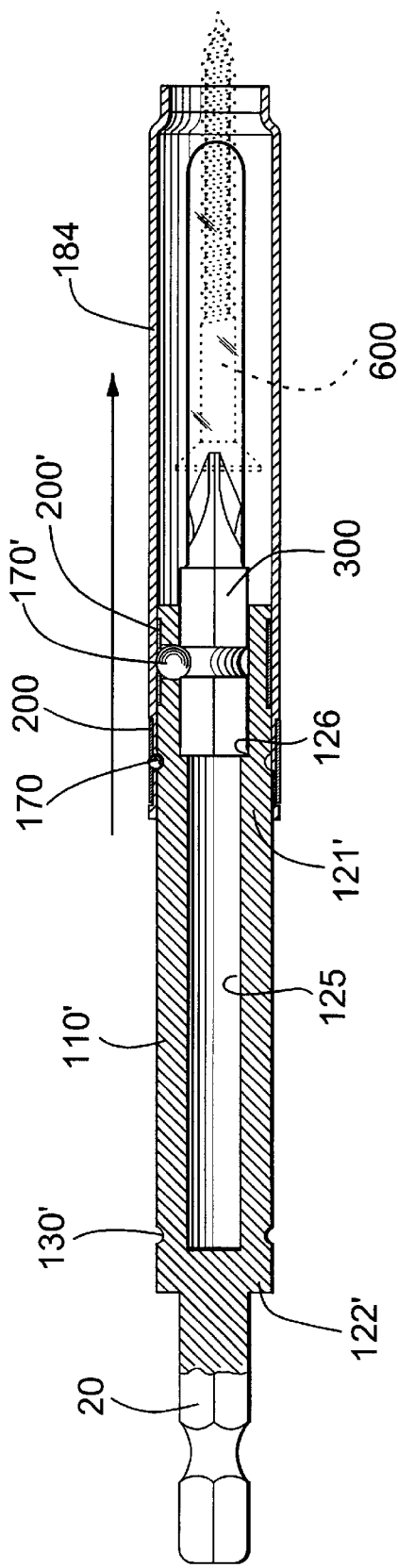
FIG.10
FIG.11

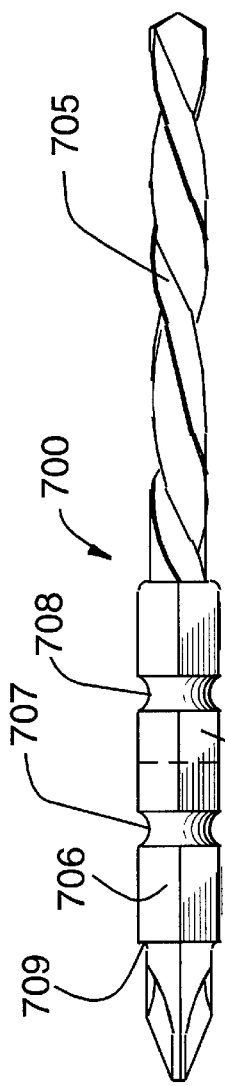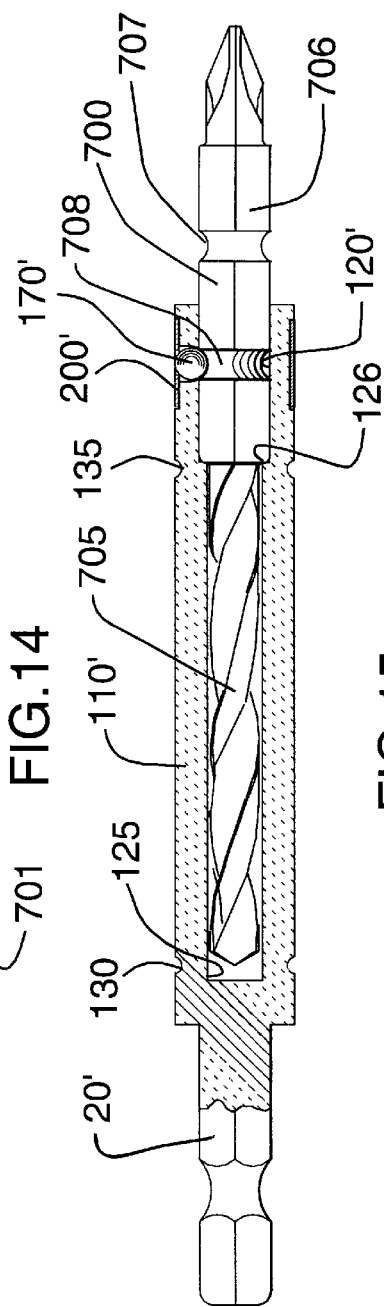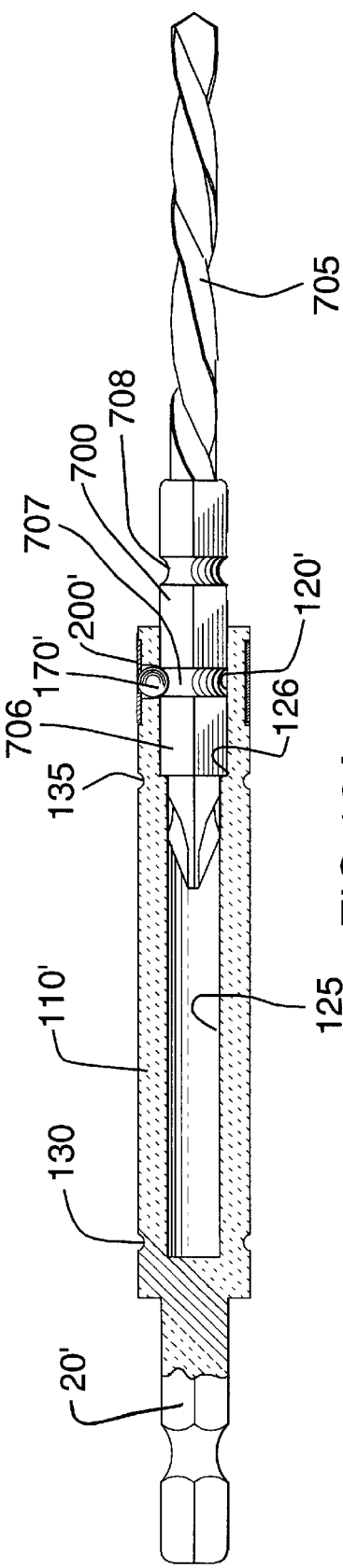

TOOL DEVICE WITH REVERSIBLE DRILL BIT/SCREW BIT

REFERENCE TO RELATED APPLICATION

This is a formal application based on and claiming the benefit of provisional application Ser. No. 60/148,589, filed Aug. 13, 1999.

BACKGROUND OF THE INVENTION

This invention relates to a tool holder device for holding a double-ended tool bit, for example a tool bit having a screw-engageable end and a drill end, especially for use in hand tools having bit holders and exchangeable bit tools.

SUMMARY OF THE INVENTION

In a first embodiment of the invention the holder comprises:

an elongated connector means having a first end and a second end, where the elongated connector means has a central longitudinal hole, of a cross-section corresponding to a cross-section of a mounting portion of the tool bit, at the first end, and a tool mount at the second end, a first sleeve arranged to reciprocally slide over the connector means between a first end position and a second end position, the first sleeve having a third end facing the tool bit and a fourth end facing the hand tool.

The connector means has a substantially cylindrical tubular first collar arranged on the connector means adjacent the first end, the first collar having an inner diameter which is cooperating with an outside diameter of the connector means, to allow the first collar to rotate on the connector means, the first collar further having a first recess to hold a first locking ball, and a second recess and a third recess arranged on an outer surface of the connector means adjacent the first end, the first locking ball being movable between the second recess and the third recess by rotation of the first collar, and the first locking ball being held in the first recess during rotation of the first collar, so that the first locking ball is seatable into either of the second or third recesses, the first collar further having a fourth recess for holding a substantially cylindrical pin, which pin rotates together with the first collar, a part of the pin reaching out into a slot arranged in the connecting means, the slot and the pin being located so that, when the first locking ball is seated in the second recess, the pin is at one extreme of the slot, and when the first locking ball is seated in the third recess, the pin is located at the other extreme. Retention of the tool bit is enabled by offsetting the hex opening in the first collar to engage the slot in the bit.

Advantageously, the connector means has a first circumferential groove adjacent the second end cooperating with a retaining ring mountable in the first circumferential groove, and an outwards facing annular ridge arranged adjacent the first end. The first sleeve has an inwards facing annular ridge arranged at the fourth end of the first sleeve, so that the inwards facing annular ridge and the outwards facing annular ridge cooperate to prevent the first sleeve from sliding off the connector means in a direction towards the first end to define the first end position, and the retaining ring and the inwards facing annular groove cooperate to prevent the first sleeve from sliding off the connector means in a direction towards the second end to define the second end position.

A further embodiment of a holder for holding a reversible tool bit/drill bit according to the invention comprises:

an elongated connector means having a second sunken recess, which is a portion of the connector means having a smaller outer diameter than a largest outer diameter of the connector means, the second recess further having a third step and a fourth step, the third and fourth steps together with a surface of the second recess defining a substantially tubular space in which a third, substantially cylindrical collar is slidingly arranged, the third collar having an axial slit running the entire length of the third collar, and the second recess further having a third radial hole and the third collar having a fourth radial hole, arranged to cooperate with a third locking ball, so that the third locking ball is prevented to fall out of the third collar when the third collar is assembled over the third locking ball onto the connector means and so that the third locking ball is prevented from passing through the third radial hole, the third locking ball serving as a stop in a corresponding groove in the tool bit, to hold the tool bit in place after insertion into the connector means.

Preferably, the connector means further comprises a fourth circumferential groove, arranged adjacent a second end of the connector means, and a fifth circumferential groove, arranged adjacent a first end of the connector means, and wherein a second sleeve is arranged to reciprocally slide over the connector means between two end positions, the connector means having an axial hole with a large diameter portion adjacent the first end of the connector means, and a small diameter portion running a substantial length of the connector means, and wherein a fifth step connects the large diameter portion and the small diameter portion of the axial hole, so that the second sleeve is extendible to stabilize a screw during an actual screw-driving operation, when the tool bit is held in the large diameter portion by abutting the fifth step, and by the third locking ball which engages the groove of the tool bit.

Advantageously, the connecting means has a first sunken recess arranged at the first end, the first recess having a first step, adjacent the first end, and a second step, facing away from the first end, the first and second steps together with a surface of the first recess defining a substantially tubular space in which a substantially cylindrical second collar is slidingly arranged, the second collar having an axial slit running the entire length of the second collar, the first recess further having a first radial hole and the second collar having a second radial hole, arranged to cooperate with a second locking ball, the second locking ball protruding a sufficient amount through the first radial hole, when the holder is assembled, to serve as a stop for the second sleeve in either the first circumferential groove or the second circumferential groove.

A reversible drill bit/screw bit tool, for use with a tool holder according to the invention, preferably comprises a hex portion at one end of the tool, and a drill portion at an opposite end of the tool, and where the hex portion has a screw driving end, shaped for engagement with a screw head, and a sixth circumferential groove and a seventh circumferential groove, for cooperation with a third locking ball of a connecting means of the holder.

According to the invention, a combination drill stop/counter sink means comprises:

a stop end, a counter sink end, a longitudinally centered through hole, which has an inner diameter corresponding to an outer diameter of a drill, a threaded radial stop screw hole in which a stop screw is lodged, the combination drill stop/counter sink means being slidable over the drill portion and securable at a desired drill depth by tightening the stop screw to abut the drill portion, a stop surface arranged perpendicularly to the through hole at the stop end, and cutting means arranged at the counter sink end.

BRIEF DESCRIPTION OF THE DRAWINGS

In order that the invention may be more clearly understood, the preferred embodiment thereof will now be described in detail by way of example, with reference to the accompanying drawings, in which:

FIG. 1A is a partially sectioned side view of a device according to a first embodiment of the invention, FIG. 1B is a sectioned end view along line A—A of FIG. 1A, seen from the collar end of the device, FIG. 2 is a side view of a double-ended tool bit according to the first embodiment of the invention, FIG. 3A is a side view of a holder device according to the first embodiment of the invention, FIG. 3B is an end view of the device according to FIG. 3A, seen from the collar end and showing the collar in a position where the device is ready for insertion of a double-ended tool bit, FIG. 3C is an end view of the device according to FIG. 3A, seen from the collar end and showing the collar in a position where the double-ended tool bit is locked in the holder, FIG. 4A is a partially sectioned side view of the device of FIG. 1A, showing the sleeve in an extended position, FIG. 5A is a side view of a hex shaft tool mount according to the first embodiment of the invention, FIG. 5B is an end view of the hex shaft tool mount of FIG. 5A, seen from the tool mount side, FIG. 6A is a sectioned side view of the removable hex shaft tool mount of FIG. 5A, FIG. 6B is an end view of the removable hex shaft tool mount of FIG. 5A, seen from the connector means side, FIG. 8A is a side view of a sleeve according to the first embodiment of the invention, FIG. 8B is a sectioned side view of the sleeve of FIG. 8A, FIG. 8C is an end view of the sleeve of FIG. 8A, FIG. 9A is a side view of a connector means according to the first embodiment of the invention, FIG. 9B is a sectioned side view of the connector means of FIG. 9A, FIG. 9C is an end view of the connector means of FIG. 9A, seen from the tool bit mounting side, FIG. 9D is an end view of the connector means of FIG. 9A, seen from the hex shaft tool mount mounting side, FIG. 9E is an end view of the connector means of FIG. 9A, seen from the tool bit mounting side with the spring mounted and the pin ready to be mounted, FIG. 10 is a sectional side view of a device according to a third embodiment of the invention, showing a retractable screw guide in its retracted position, FIG. 11 is a sectional side view of the device according to FIG. 10, showing the screw guide in its extracted position.

FIG. 14 is a side view of a reversible drill bit/screw bit according to a second embodiment of the invention, FIG. 15 is a sectional side view of a device according to a second embodiment of the invention, using the reversible drill bit/screw bit shown in FIG. 14, FIG. 16A is a sectional side view of the device shown in FIG. 15.

DETAILED DESCRIPTION OF THE PREFERRED EMBODIMENT

Figure 7A:
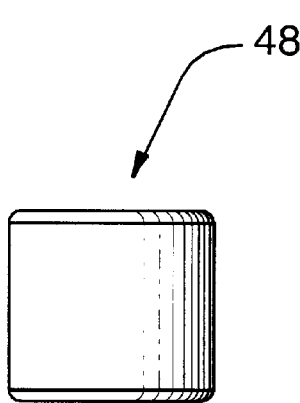
FIG. 7A is a side view of a pin according to the first embodiment of the invention.

A first embodiment of the invention is shown in FIGS. 1A to 9F. The tool holder device 10 has an elongated connector means 50, which has a longitudinal hole 53. The longitudinal hole has a bit mount end 55, having a larger cross-section than the longitudinal hole, and a tool mount end 54, having a cross-section adapted to receive a tool mount 20. Further, the connector means 50 has an outward annular ridge 51 arranged towards the bit mount end. A first sleeve 100 is arranged to reciprocally slide over the connector means, the first sleeve having a general inner diameter cooperating with the outer diameter of the outward annular ridge so that the first sleeve is being supported by the ridge during the sliding motion of the first sleeve. The first sleeve, in its extended positions, is used to stabilize screws or other devices which are to be operated with a tool bit held in the holder device 10, and may have an opening or transparent window as seen in FIGS. 4A and 11 so that the screw may be seen. The first sleeve further has an inward annular ridge 106, arranged at an end of the first sleeve, which will be facing the tool mount of the assembled device, which further supports the first sleeve during the sliding motion of the first sleeve. The first sleeve is prevented from sliding too far towards the tool mount by a retaining ring 60 arranged in a groove 52 arranged at the end of the connector means 50 which is facing the tool mount. The retaining ring preferably is substantially circular having end surfaces 61 forming a gap, to facilitate assembly of the retaining ring onto the connector means. The inward annular ridge 106 cooperates with the outward annular ridge 51 to prevent the first sleeve from sliding off the connector means in the direction of the bit mount.

Further, a substantially cylindrical tubular first collar 40 is arranged on the connector means 50 adjacent the bit mount 55. The first collar has an inner diameter 40' which is cooperating with the outside diameter of the connector means 50, to allow the first collar to rotate on the connector means. The first collar has a bit opening hole 45, which has substantially the same shape and size as the bit mount end 55. The first collar has a first recess 49 to hold a first locking ball 47. The connector means 50 has a second recess 48 and a third recess 48' arranged on an outer surface of the connector means adjacent the bit mount 55. The first locking ball is movable between the second recess and the third recess by rotating the first collar 40. The first locking ball is then held in the first recess during rotation of the first collar, and clicks into either of the second or third recesses. The first collar has a fourth recess 57 for holding a substantially cylindrical pin 56, which also rotates together with the first collar. The part of the pin, which is not located in the fourth recess, sticks out into a slot 46 arranged in the connecting means 50. The slot and the pin are located so that, when the first locking ball 47 is seated in the second recess 48, the pin is at one extreme of the slot, and when the first locking ball is seated in the third recess, the pin is located at the other extreme. Retention of the tool bit is enabled by offsetting the hex opening in the first collar to engage the slot in the bit. The bit is thus locked in the holder.

A double-ended tool bit 400 is shown in FIG. 2. The bit has a drill portion 401 and an opposite screw bit portion 402, with a middle portion 410 which holds them together. The middle portion has a cross-section corresponding to the cross-section of the bit mount end 55, and a groove 420 arranged to cooperate with the pin 56.

The tool mount 20 preferably has a retaining groove end 30, for attachment to standard hand or power tools, and a knurled end 35 opposite the retaining groove end. A relief recess 25 may be arranged at the knurled end, to accommodate ends of tool bits that stretch far into the tool holder device 10. The knurled end is securely attachable to the tool mount end 54 of the connector means 50, to facilitate production and assembly of the device. The tool mount 20 preferably has a hex cross-section to fit standard hand or power tools.

A second embodiment of the invention is shown in FIGS. 10 to 16C. The connector means 110' has a first circumferential groove 130' and a second circumferential groove 135'. A second sleeve 184 is arranged to reciprocally slide on the connector means 110' between two end positions. The second sleeve has a first end 187, adjacent a tool bit 300 and a second end 185, adjacent the tool holder 20', of the assembled device. A narrow portion 186 is arranged at the second end. The second sleeve 184 further has a first sunken recess 188, which is a portion of the sleeve with a smaller outer diameter than the largest outer diameter of the sleeve, arranged adjacent the second end 185. The first recess has a first step 191, adjacent the second end, and a second step 192, facing away from the second end. The steps and the surface of the first recess 188 define a substantially tubular space in which a second collar 200 is slidingly arranged. The second collar is substantially cylindrical, with an axial slit 202 running the entire length of the second collar. The first recess further has a first radial hole 189 and second collar 200 has a second radial hole 193, arranged to cooperate with a second locking ball 170. The diameter of the second radial hole is slightly smaller than the diameter of the second locking ball, so that the second locking ball is prevented to fall out of the second collar 200 when the second collar is assembled over the second locking ball onto the second sleeve 184. Similarly, the diameter of the first radial hole 189 is slightly smaller than the diameter of the second locking ball, so that the second locking ball is prevented from passing through the first radial hole. The second locking ball protrudes a sufficient amount through the first radial hole, when the device is assembled, to serve as a stop in either the first circumferential groove 130' or the second circumferential groove 135'. A user of the holder may, by pressing the second sleeve in either direction along the connector means 110', slide the second sleeve between a first position, in which the second locking ball 170 is seated in the first circumferential groove, to a second position, in which the second locking ball is seated in the second circumferential groove. The second collar 200 provides the necessary spring force to press the second locking ball towards the first radial hole 189. The second collar is expanded if the user presses hard enough on the second sleeve to permit the second locking ball to slide out of the first or second circumferential groove, respectively.

The elongated connector means 110' has a second sunken recess 188', which is a portion of the connector means with a smaller outer diameter than the largest outer diameter of the connector means. The recess has a third step 191' and a fourth step 192'. The steps and the surface of the second recess 188' define a substantially tubular space in which a third collar 200' is slidingly arranged. The third collar is substantially cylindrical, with an axial slit running the entire length of the collar. The second recess further has a third radial hole 189' and the third collar 200' has a fourth radial hole 193', arranged to cooperate with a third locking ball 170'. The diameter of the fourth radial hole is slightly smaller than the diameter of the third locking ball, so that the third locking ball is prevented to fall out of the third collar 200' when the third collar is assembled over the third locking ball onto the connector means 110'. Similarly, the diameter of the third radial hole 189' is slightly smaller than the diameter of the third locking ball, so that the third locking ball is prevented from passing through the third radial hole. The third locking ball protrudes a sufficient amount through the third radial hole, when the device is assembled, to serve as a stop in a corresponding groove in a tool bit, or similar, to hold the tool bit in place after insertion into the connector means 110'. The third collar 200' provides the necessary spring force to press the third locking ball 170' towards the third radial hole 189', but the third collar is expanded if the user pulls hard enough on the tool bit to permit the third locking ball to slide out of the groove in the tool bit. The third collar 200', the third locking ball 170' and the second recess 188' thus cooperate in a way similar to that of the second collar 200, second locking ball 170 and the first recess 188, described above.

The connector means 110' according to the second embodiment of the invention further comprises a fourth circumferential groove 130', arranged adjacent a second end 122' of the connector means, and a fifth circumferential groove 135', arranged adjacent a first end 121' of the connector means. A second sleeve 184 (as described earlier) is arranged to reciprocally slide over the connector means 110' between two end positions. The connector means has an axial hole having a large diameter portion 120' adjacent the first end 121' of the connector means, and a small diameter portion 125 running a substantial length of the connector means. A fifth step 126 connects the large diameter portion and the small diameter portion of the axial hole. The second sleeve 184 may be retracted to stabilize a screw 600 during the actual screw-driving operation. The single tool bit 300 is then held in the large diameter portion 120' by abutting the fifth step 126, and by the third locking ball 170' which engages the groove of the tool bit.

Figure 16B:
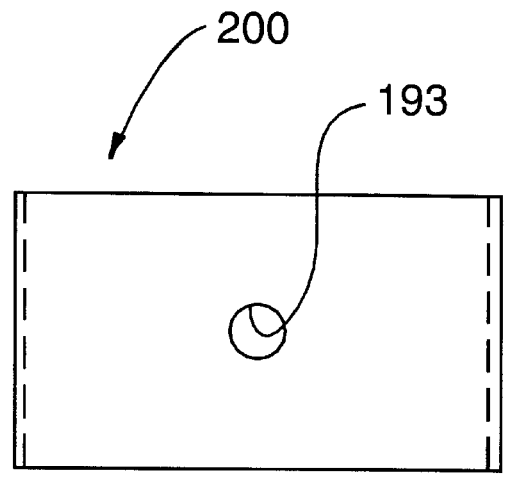
FIG. 16B is a side view of a spring according to the first embodiment of the invention.
Figure 7B:
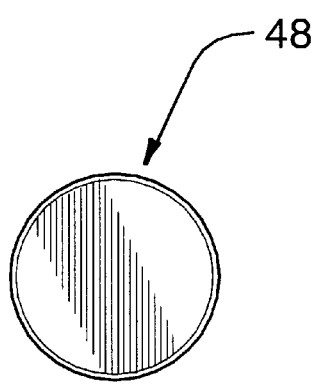
FIG. 7B is a top view of the pin of FIG. 7A.
Figure 16C:
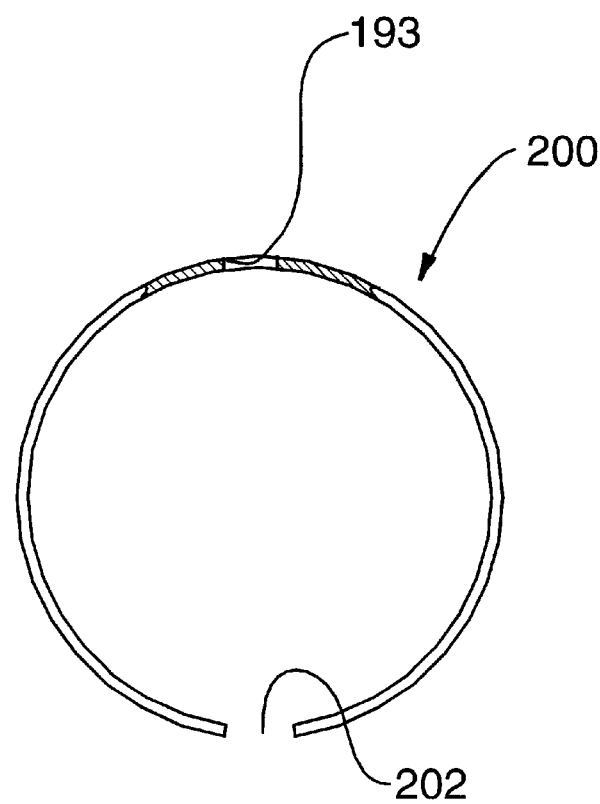
FIG. 16C is a top view of the spring of FIG. 16B.
Figure 9G:
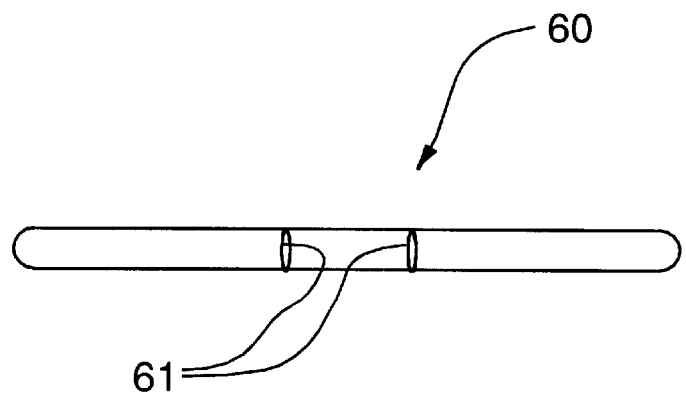
FIG. 9G is a side view of the retaining ring of FIG. 9F.
Figure 9F:
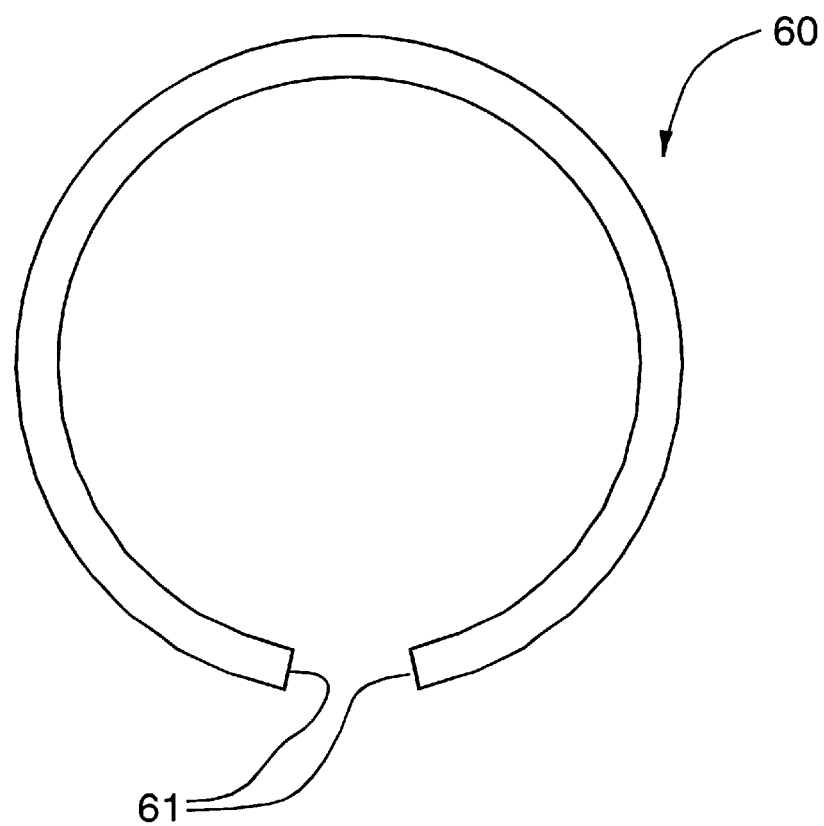
FIG. 9F is a top view of a retaining ring according to the invention.
Figure 12:
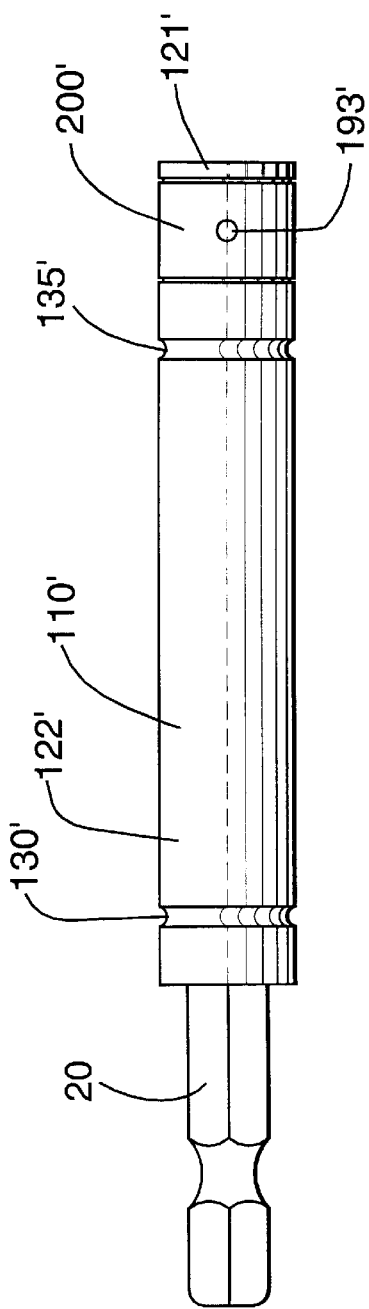
FIG. 12 is a sectional side view of a connector means according to the third embodiment of the invention.
Figure 13:
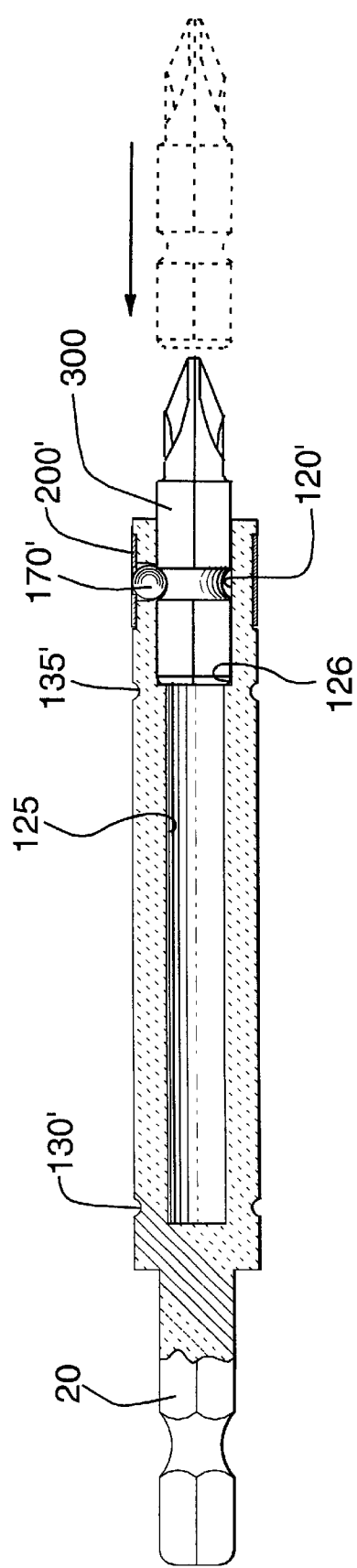
FIG. 13 is a sectional side view of the device shown in FIG. 12, showing an inserted single screw bit.
Figure 17A:
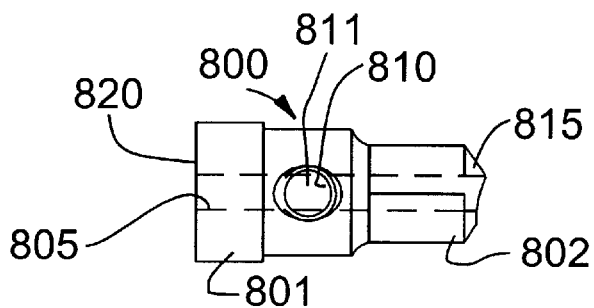
FIG. 17A is a side view of a combination drill stop and counter sink device according to a tenth embodiment of the invention.
Figure 17B:
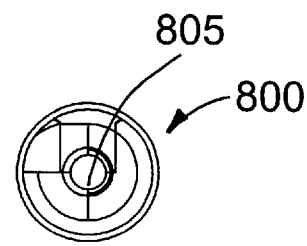
FIG. 17B is a frontal view of the combination drill stop and counter sink device according to the tenth embodiment of the invention, as seen from the counter sink side.
Figure 17C:
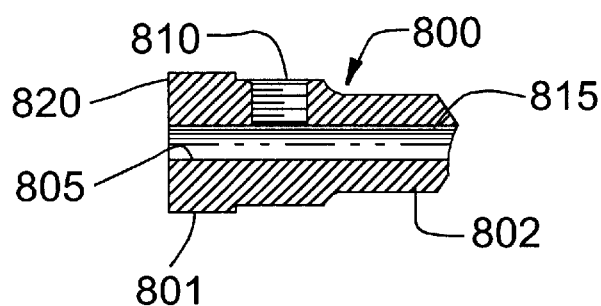
FIG. 17C is a sectional side view of the combination drill stop and counter sink device according to the tenth embodiment of the invention.

In FIG. 14, a reversible drill bit/screw bit tool 700 is shown. The tool comprises a preferably hex portion 701 at one end of the tool, and a drill portion 705 at the other end of the tool. The hex portion has a screw driving end 706, shaped for engagement with a screw head. The hex portion 701 further has a second circumferential groove 707 and a seventh circumferential groove 708, for cooperating with the third locking ball 170', as described above for the single bit tool. Thus, the reversible drill bit/screw bit tool 700 can be inserted into the axial hole of the connector means 110' so that the drill portion 705 extends into the small diameter portion 125 and the hex portion 701 abuts the fifth step 126, as shown in FIG. 15. The third locking ball 170' is engaged in the seventh circumferential groove 708, in this case. Alternatively, the reversible drill bit/screw bit tool 700 can be inserted into the axial hole of the connector means 110' so that the screw driving end 706 extends into the small diameter portion 125 with a shoulder 709 of the screw driving end abutting the fifth step 126, and the drill portion 705 extending out from the tool, as shown in FIG. 16A. The third locking ball 170' is engaged in the second circumferential groove 707, in this case.

Figure 18:
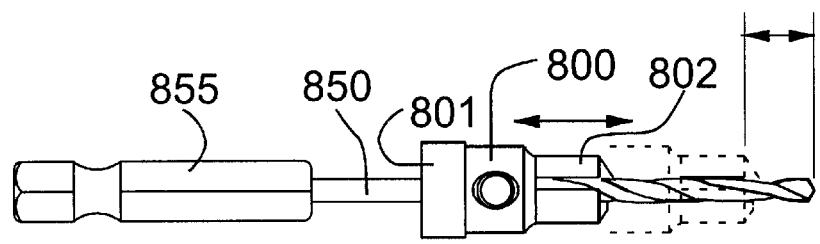
FIG. 18 is a side view of a combination drill stop and counter sink device according to the tenth embodiment of the invention, showing the device mounted on a hex mount drill bit, in the counter sink position.
Figure 19:
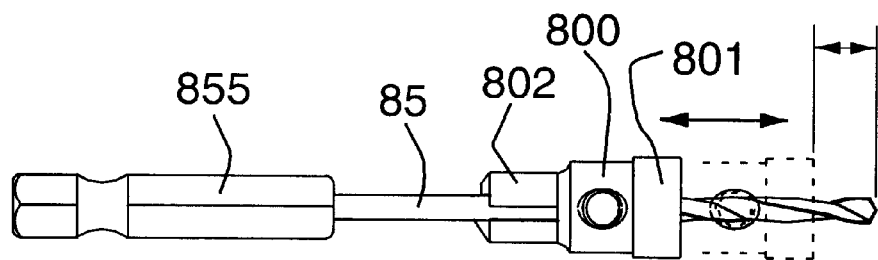
FIG. 19 is a side view of a combination drill stop and counter sink device according to the tenth embodiment of the invention, showing the device mounted on a hex mount drill bit, in the drill stop position.
Figure 20:
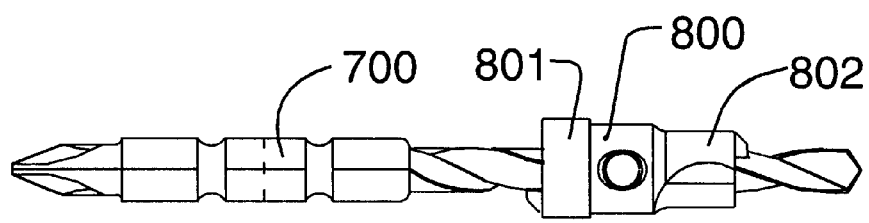
FIG. 20 is a side view of a combination drill stop and counter sink device according to the tenth embodiment of the invention, showing the device on a reversible drill bit/screw bit according to the sixth embodiment of the invention, in the counter sink position.
Figure 21:
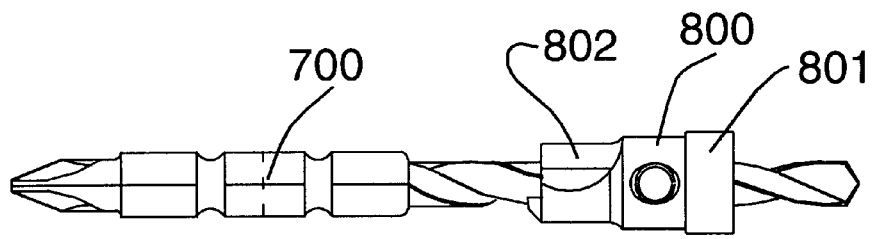
FIG. 21 is a side view of a combination drill stop and counter sink device according to the tenth embodiment of the invention, showing the device on a reversible drill bit/screw bit according to the sixth embodiment of the invention, in the drill stop position.

A further embodiment of the invention is shown in FIGS. 17A to 21. A combination drill stop/counter sink means 800 comprises a stop end 801 and a counter sink end 802. The combination drill stop/counter sink means further has a longitudinal centered through hole 805, which has an inner diameter corresponding to the outer diameter of a drill 850, optionally having a hex mount 855, or the drill portion 705 of the reversible drill bit/screw bit tool 700 described above. The combination drill stop/counter sink means 800 has a threaded radial stop screw hole 810 in which a stop screw 811 is lodged. The combination drill stop/counter sink means is intended to be slid over the drill/drill portion and secured at the desired drill depth by tightening the stop screw 811. A stop surface 820 is arranged perpendicularly to the through hole 805 at the stop end 801, and cutting means 815 are arranged at the counter sink end 802. Thus, the combination drill stop/counter sink means can be used either as a drill stop, when the stop end 801 is facing the work piece (as shown in FIGS. 19 and 21), or as a counter sinker, when the counter sink end 802 is facing the work piece (as shown in FIGS. 18 and 20). The counter sink operation is performed directly after the drill has reached the preset depth, making it unnecessary to change tools for the two operations drilling and counter sinking, respectively.

The device according to any of the described embodiments of the invention adds safety to the use of the device, because the sleeve may be extended to laterally stabilize a screw, or the like, during driving of the screw into a workpiece. In this way, the device prevents the screw from collapsing sideways during higher torque applications.

It will be appreciated that the above description relates to the preferred embodiments by way of example only. Many variations on the invention will be obvious to those knowledgeable in the field, and such obvious variations are within the scope of the invention as described and claimed, whether or not expressly described.

Figure 22:
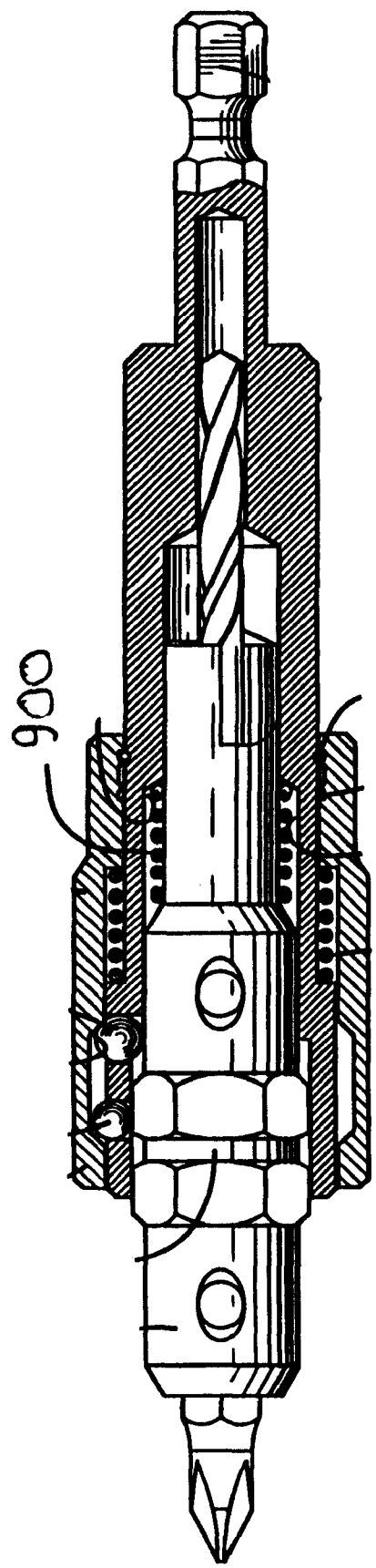
FIG. 22 is a view showing an "auto-eject" feature in another device, which may be readily adapted to the present device.

As one further variation, for example, it should be noted that the device could be configured with an "auto-eject" feature, similar to that shown by reference numeral 900 in FIG. 22. Although that drawing is of another device, the same principle can be readily adapted to the present device.

What is claimed as the invention is:

1. A tool bit holder for use with a tool, th tool bit holder for holding a reversible tool bit, the tool bit holder comprising;

a tool bit holler body;

a shank provided on the tool bit bolder body, the shank for mounting the tool bit holder onto the tool;

a tool bit socket provided on the tool bit holder body, the socket for receiving the reversible tool bit;

a locking collar engaging the reversible tool bit and preventing removal of the reversible tool bit from the tool bit socket; and a stabilizing sleeve slidingly telescopingly mounted on the tool holder body and movable between a first position in which the stabilizing sleeve is extended over the locking collar and the tool bit to stabilize a workpiece engaged by the tool bit and a second position in which the stabilizing sleeve is retracted from the reversible tool bit.

2. The tool bit holder of claim 1, wherein the tool bit connector is a receiving cavity having a cross-section corresponding to a cross-section of the reversible tool bit.

3. The tool bit holder of claim 1, wherein the tool bit connector is a receiving cavity having a hexagonal cross-section.

4. The tool bit bolder of claim 1, further comprising first and second detents provided on the tool bit holder body, the first and second detents corresponding to the first and second positions of the stablizing sleeve.

5. The tool bit holder of claim 4, wherein the detents are defined by annular rings provided on the tool bit holder body, each annular ring for engagement with a corresponding annular recess provided in the stablizing sleeve.

6. The tool bit holder of claim 5, wherein the annular rings are mounted in annular grooves provided on the tool bit holder body.

7. The tool bit holder of claim 4, wherein the detents are defined by locking balls provided on the tool bit holder body and corresponding annular recess provided in the stablizing sleeve.

8. The tool bit holder of claim 1, wherein the locking collar is radially displaceable between a locking position in which the collar prevents removal of the tool bit from the tool bit socket and a release position in which the collar allows removal of the tool bit from the tool bit socket.

9. The tool bit holder of claim 1, wherein The outside diameter of the locking collar is less than the inside diameter of the stabilizing sleeve.

* * * * *